United States Patent [19]

Werner

[11] Patent Number: 4,923,934

[45] Date of Patent: May 8, 1990

[54] INTERPENETRATING POLYMER NETWORK OF BLOCKED URETHANE PREPOLYMER, POLYOL, EPOXY RESIN AND ANHYDRIDE

[76] Inventor: Todd A. Werner, 11515 - 41st Ave. North, Plymouth, Minn. 55441

[21] Appl. No.: 294,934

[22] Filed: Jan. 5, 1989

Related U.S. Application Data

[63] Continuation of Ser. No. 55,299, May 29, 1987, abandoned.

[51] Int. Cl.$^5$ .................... C08L 63/02; C08L 67/02; C08L 71/02; C08L 75/06
[52] U.S. Cl. .................................. 525/528; 525/903; 523/400; 523/454
[58] Field of Search ................ 525/903, 528; 523/400, 523/454

[56] References Cited

U.S. PATENT DOCUMENTS

| | | | |
|---|---|---|---|
| 4,070,323 | 1/1978 | Vanderhoff et al. | 524/813 |
| 4,128,600 | 12/1978 | Skinner et al. | 260/859 |
| 4,247,578 | 1/1981 | Skinner et al. | 427/44 |
| 4,342,793 | 8/1932 | Skinner et al. | 427/44 |
| 4,423,099 | 12/1983 | Mueller et al. | 525/903 |
| 4,532,316 | 7/1985 | Henn | 528/74 |
| 4,594,397 | 6/1986 | Goel et al. | 525/528 |
| 4,613,543 | 9/1986 | Dabi | 525/375 |
| 4,631,319 | 12/1986 | Blahak et al. | 525/437 |
| 4,694,051 | 9/1987 | Kordomenos et al. | 525/437 |

OTHER PUBLICATIONS

Frisch, H. L., "Advances in Interpenetrating Polymer Networks", *Pure and Applied Chemistry*, vol. 53, pp. 1557–1566 (1981).

Roesler, R. R., "Using IPNs to Formulate High–Solids Coatings", *Modern Paint and Coatings*, pp. 46–55 (Apr. 1986).

Klempner, H. K. et al, "Polyurethane–Acrylic Copolymer Pseudo Interpenetrating Polymer Networks", *Polymer Science and Technology*, pp. 185–201 (1980).

Frisch, H. L. et al, "Barrier and Surface Properties of Polyurethane–Epoxy Interpenetrating Polymer Networks", *Polymer Science & Technology*, vol. 10, pp 97–112, 1977.

*Primary Examiner*—Lewis T. Jacobs
*Assistant Examiner*—Robert E. L. Sellers, II
*Attorney, Agent, or Firm*—Kinney & Lange

[57] ABSTRACT

A composition for use in forming an interpenetrating polymer network includes a blocked urethane prepolymer, a polyol, an epoxy resin and an epoxy catalyzing agent.

6 Claims, No Drawings

INTERPENETRATING POLYMER NETWORK OF BLOCKED URETHANE PREPOLYMER, POLYOL, EPOXY RESIN AND ANHYDRIDE

This is a continuation of application Ser. No. 055,299 filed May 29, 1987 now abandoned.

BACKGROUND OF THE INVENTION

1. Field of the Invention.

The present invention relates to a composition for forming an interpenetrating polymer network and, in particular, wherein such interpenetrating polymeric network is used as a coating.

2. Description of the Prior Art.

A primary concern in the field of coating technology has been the production of a material combining the properties of flexibility, adhesion, hardness, corrosion resistance, humidity resistance and resistance to chemical attack.

In recent years, a further concern in the field of coating technology has been the reduction of the level of volatile solvents emitted during cure. Solvents are used to dilute the coating composition and to facilitate application of the coating composition to appropriate substrates and are released into the atmosphere during cure. To reduce the emission of volatile solvents, such as toluene, methyl ethyl ketone and similar hazardous chemicals has been a longstanding goal of the government on the federal and state level.

Some of the prior art coating compositions include crosslinked polymer networks of chemicals such as epoxy, acrylic, polyester or urethane crosslinked resins. Copolymers formed by chemically crosslinking different polymers to each other have also been formulated in an attempt to obtain satisfactory coating compositions. However, it has been difficult to synthesize copolymers that actually combine the desirable properties possessed by the individual polymer networks crosslinked separately.

Interpenetrating polymer network technology was developed in academic research laboratories. Interpenetrating polymer networks are formed when polymerizable compositions are independently reacted to form distinct, intertwining, continuous polymeric chains. Combining chemically different types of polymeric networks results in the formation of resins having different properties. The interpenetrating polymer network produced exhibits properties that are different from the individual constituent polymers.

The Skinner et al U.S. Pat. Nos. 4,128,600; 4,247,578 and 4,342,793 disclose interpenetrating polymer network technology for plastics based on a two-component urethane system polymerized simultaneously with an acrylic monomer. Initially, a polyol and a polyisocyanate are combined with a reactive diluent (the acrylic monomer) having a radiation-sensitive double bond. The polyol and polyisocyanate react to form a crosslinked polyurethane and the reactive diluent is polymerized in a free radical chain reaction separately from the urethane polymerization.

SUMMARY OF THE INVENTION

The present invention includes an interpenetrating polymer network formed by the reaction product of a blocked urethane prepolymer, a polyol, an epoxy resin and an epoxy catalyzing agent. The interpenetrating polymer network is useful as a coating exhibiting excellent adhesion properties along with corrosion resistance and resistance to chemical attack. These properties are achieved in high solids systems.

The present invention also includes a process for forming an interpenetrating polymer network by preparing a mixture including a blocked urethane prepolymer, a polyol, an epoxy resin and an anhydride and curing said mixture.

DETAILED DESCRIPTION OF THE PREFERRED EMBODIMENTS

The present invention includes an interpenetrating polymer network formed by the reaction product of a blocked urethane prepolymer, a polyol, an epoxy prepolymer and an epoxy catalyzing agent. The reaction product is used as a coating that exhibits good adhesion, humidity resistance, corrosion resistance and chemical resistance.

By interpenetrating polymeric network is meant two chemically different polymer chains intertwined with each other. The polymers may be crosslinked but with no apparent chemical bonding between the polymers with perhaps only accidental covalent bonds. The intertwining is of a permanent nature and is made by homo-crosslinking of the two polymers.

The interpenetrating polymer network of the present invention is formed as a protective coating by applying the blocked urethane prepolymer, the polyol, the epoxy prepolymer, and the epoxy catalyzing agent in an organic solvent as a clear liquid mixture to the substrate to be coated. One important aspect of the present invention is that all four primary constituents of the mixture are applied as a single component and cured as a single system to form the interpenetrating polymer network. Crosslinking between the two different polymer chains does not occur using the mixture of the present invention.

The blocked urethane prepolymer of the present invention preferably has an isocyanate functionality greater than one. An isocyanate functionality greater than one is needed to ensure a high degree of crosslinking.

The urethane prepolymer is blocked to prevent premature polymerization or crosslinking of the polyisocyanate groups. Preferably, the isocyanate group is blocked with caprolactone. The caprolactone volatilizes at a temperature of approximately 300° F., exposing the polyisocyanate groups for crosslinking. Examples of other types of blocking agents that are suitable in the present invention include methyl ethyl ketoxime and phenol.

Examples of commercially available blocked urethane prepolymers include Cargill 4510 and 5797, available from the Cargill Company of Minneapolis, Minn. Examples of other polyisocyanates suitable for use in the present invention, once the isocyanate groups are blocked, include ethylene diisocyanate, trimethylene diisocyanate, hexamethylene diisocyanate, propylene-1,2-diisocyanate, ethylidene diisocyanate, cyclopentylene-1,3-diisocyanates, the 1,2-, 1,3- and 1,4-cyclohexylene diisocyanates, the 1,3- and 1,4-phenylene diisocyanates, polymethylene polyphenyleneisocyanates, the 2,4- and 2,6-toluene diisocyanates, the 1.3- and 1.4-xylylene diisocyanates, bis(4-isocyanatophenyl)methane, 4,4'-diphenylpropane diisocyanates, bis(2-isocyanatoethyl) carbonate, 1,8-diisocyanato-pmenthane, 1-methyl-2,4diisocyanatocyclohexane, the chlorophenylene diisocyanates, naphthalene-1,5-diisocyanate triphenylmethane-4,4',4"-triisocyanate, isopropyl benzenealpha-4-diisocyanate, 5,6-diisocyanatobutylbicyclo [2.2.1]hept-2-ene and similar polyisocyanates.

The polyol is required in the present invention to form the urethane linkage with the isocyanate through the hydroxyl functionality of the polyol. Preferably, the polyol is saturated. The urethane linkage is represented as

It is further required that the saturated polyol must, as its name implies, contain at least two hydroxy functional groups to ensure the proper degree of cross-linking during the thermal cure step.

The saturated polyol may be an alkyl or cycloalkyl polyol, an ester linked polyol, an ether linked polyol, an ether and ester linked polyol or hydroxy functional acrylic copolymers.

Of particular preference in the present invention are commercially-available polyesters sold by Cargill Company under the trademarks Cargill 5763 and Cargill 6685.

Specific examples of alkyl and cycloalkyl polyols include 2,5-hexanediol available from Aldrich Chemical, 1,6-hexanediol, available from Celanese Chemcal, ethylene glycol available from Baker, glycerol, 1,2,6-hexanetriol available from Union Carbide, pentaerythritol, and 1,4-cyclohexane diol. Additional examples of such polyols include Polybd R-45HT a Butadiene diol having an approximate molecular weight of 2800 available from Arco and Trimethylol propane available from Celanese.

The ester linked saturated polyols are structurally represented as

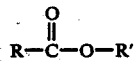

where R and R' are organic residues which contain at least two hydroxyl radicals and at least one ester link.

Examples of ether linked saturated polyols include Niax PCP0200 and PCP0240 both available from Union Carbide and having respective molecular weights of approximately 530 and 2000. Both of the foregoing compounds are diols. Niax PCP0300 also available from Union Carbide is a caprolactone-ester triol having approximate molecular weight of 540. Niax PCP0310 also available from Union Carbide is a caprolactone-ester triol having a molecular weight of approximately 900.

The ether linked saturated polyols of the present invention include compounds such as diethylene glycol and triethylene glycol both available from Fisher. Further ether linked saturated polyols useful in the present invention include the Polymeg Q0650, Q0100, and Q0200 all of which are ether diols available from Quaker having a respective molecular weight of approximately 650, 100 and 2000. Pluarcol P1010 having an approximate molecular weight of 1050 available from Wyandotte is an example of a polypropylene oxide ether linked diol useful in the present invention. Similar Wyandotte products useful as saturated polyols in the present invention include pluracol TP440 and 150 which are propylene oxide ether linked triols having respective molecular weights of approximately 425 and 1560. In similar fashion pluracol GP3030 is another saturated polyol suitable for the present invention available from Wyandotte. The foregoing material is a glycerine polypropylene ether linked triol having an approximately molecular weight of 2900.

Additional pluracols useful in the present invention include pluracol PEP450 which is a pentaerythritol polypropylene oxide ether linked tetrol having a molecular weight of 405 and pluracol 493 an ether linked tetrol having a molecular weight of approximately 3630.

Ester and ether linked saturated polyols suitable in the present invention are described structurally as

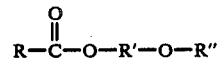

where R, R' and R" are organic residues containing at least two hydroxyl radicals and at least one ester and one ether linkage.

In an alternative embodiment of the present invention, urethane polymerization catalysts may be added to the interpenetrating polymer composition of the present invention prior to use. The urethane polymerization catalysts assist crosslinking of the polyisocyanate groups and polyol subsequent to volatilzation of the blocking group from the blocked urethane prepolymer. Suitable catalysts include dibutyltin dilaurate, stannous octoate available from the Air Products & Chemicals, Inc. of Allentown, Pa., and tetraethyltitanate, available from Dynamit-Nobel of America, Inc. of Northvale, N.J.

In the preferred embodiment of the present invention, the ratio of blocked urethane prepolymer to polyester is in the range of 0.5 to 1.1 of blocked isocyanate equivalents to polyol equivalents.

The second polymer of the interpenetrating polymeric network of the present invention includes a cured epoxy resin. The epoxy resin is preferably cured using an anhydride. Suitable epoxy resins include those made from epichlorohydrin and bisphenol A, epichlorohydrin and an aliphatic polyol such as glycerol, polyolefins oxidized with peracetic acid, as well as epoxy resins modified to obtain the addition of other desirable physical and/or chemical properties such as the flame-retardant property conferred by halogenated bisphenols.

Other examples of epoxy resins suitable for the present invention include glycidyl ethers of novolac resins; epoxidized derivatives of polyethylenically unsaturated polycarboxylic acids, such as, for example, diethyl 5,6,10,11-diepoxyoctadecyl succinate; epoxidized polyesters obtained by reacting an unsaturated polyhydric alcohol and/or unsaturated polycarboxylic acid or andydride groups, such as, for example, the polyester obtained by reacting 8,9,12,13-eicosanedienedioic acid with ethylene glycol, the polyester obtained by reacting the diethylene glycol with 2-cyclohexane-1,4-dicarboxylic acid and the like, and mixtures thereof; epoxidized polyethylenically unsaturated hydrocarbons, such as epoxidized 2,2-bis(2-cyclohexenyl)propane, epoxidized vinyl cyclohexene and epoxidized dimer of cyclopentadiene; epoxidized esters of unsaturated alcohols and unsaturated carboxylic acids, such as glycidyl glycidate, 2,3-epoxybutyl 3,4-epoxypentanoate; 3,4-epoxy3,4-epoxyhexyl, 3,4-epoxypentanoate; 3,4-epoxycyclohexyl 3,4-epoxycyclohexyl metyl epoxycyclohexane carboxylate; and epoxidized esters of unsaturated monohydric alcohols and polycarboxylic acids, such as, for example, diglycidyl adipate, diglycidyl isopthalate, di(2,3-epoxybutyl) adipate, di(2,3-epoxybutyl)-oxalate, di(2,3-epoxyhexyl) succinate, di(3,4-epoxybutyl) maleate, di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl) thiodipropionate, di(5,6-epoxytetradecyl)diphenyldicarboxylate, di(3,4-epoxyheptyl) sulfonyldibutyrate, tri(2,3-epoxybutyl)-1,2,4-butanetricarboxylate, di(5,6-epoxypentadecyl)maleate, di(2,3-epoxy butyl)-azelate, di(3,4)-epoxybutyl) citrate, di(5,6-epoxyoctyl)-cyclohexane-1,3-dicarboxylate, and di(4,5-epoxyoctadecyl)malonate.

Suitable anhydrides for use in the present invention include linear polymeric anhydrides, alicyclic anhydrides, aromatic anhydrides, chlorinated and brominated anhydrides, blends and adducts of the same. Examples of particularly useful anhydrides include nadic methyl anhydride, dodecyl succinic anhydride, methyl hexahydrophthallic anhydride and hexahydrophthalic anhydride. An example of a particularly suitable anhydride that is commercially available from the Ciba-Geigy Corporation of Ardsley, New York is the anhydride sold under the trademark Hardener HY906. In the preferred embodiment of the present invention, the ratio of anhydride to epoxy resin is determined by providing approximately 0.6–1.0 by anhydride equivalents to epoxy equivalents.

Alternatively, the epoxy resin may be cured in a manner other than by using an anhydride. Other well known curing mechanisms are includable within the scope of the present invention. These mechanisms include Lewis bases such as alkali metal hydroxides, amines such as tri(dimethylaminomethyl)-phenol sold under the trademark DMP30 and dimethylaminomethylphenol sold under the trademark DMP10 available from Rohm Hass Company of Philadelphia, Pa., and amides such as amidopolyamines and Lewis acids such as phenols and organic acids.

Of particular suitability as catalysts in the present invention are tetrapropyl zirconate, tetraisopropyl titanate, tetraethyl titanate, tetrabutyl zirconate and titanium acetyl acetonate available from the Dynamit-Nobel Company. Other tertiary amines such as benzyldimethylamine, benzyl-diethylamine, triethylamine, tripropylamine and pyridine; organometallics such as diethyl zinc, methylmagnesium iodide, butyllithium, tetraethyllead, triethylaluminum and sodium methylate; and diamines such as hydrazine are also useful as catalysts for forming the interpenetrating polymer network of the present invention.

The following is a preferred range of the preferred constituents of the prepolymer composition of the present invention.

| Constituent | Range Equivalent Weight |
|---|---|
| Epoxy resin | 170–3000 |
| Blocked urethane prepolymer | 195–1000 |
| Saturated polyester resin | 195–2000 |
| Anhydride | 100–270 |

In preparing the prepolymeric mixture of the present invention, the blocked urethane prepolymer, the polyol, an epoxy resin and an epoxy catalyzing agent are mixed to form a single viscous liquid. A solvent such as methyl isobutyl ketone or toluene, alone or in combination with each other, is used at a ratio of approximately 0.05 to 5.0 pounds of solvent to each pound of resin. Preferably, the ratio of urethane polymer to epoxy polymer is approximately 0.2–0.8 by weight.

Catalysts are added to the prepolymer mixture, preferably just before the prepolymer mixture is applied to the substrate to be coated. However, using the composition of the present invention, the catalysts may be added several days in advance, or when added immediately prior to application, the same catalyst-containing mixture can be used for several days without premature polymerization of the mixture resulting. In fact, the prepolymer composition of the present invention with catalyst can be stored with the catalyst for at least five days and probably up to several weeks, depending on the level of catalyst incorporated.

The mixture of the present invention is applied to a surface, such as wood, metal, paper, plastics or the like, by any conventional method including dipping, brushing or spraying. The coating composition of the present invention is used as both a primer or a top coat. The composition of the present invention is particularly useful as a primer since it exhibits excellent adhesion to metal surfaces.

The coated surface is then cured. Preferably, the coated surface is exposed to at least 250° F. if the blocking agent used in the polyurethane prepolymer is caprolactone. The caprolactone at approximately 300° F. volatilizes, exposing the isocyanate groups to reaction with the polyester. In addition, the heat will activate the catalystcontrolled epoxy reaction such that the epoxy will cure simultaneously with the polyurethane forming the interpenetrating polymer network of the present invention. Depending on the type of blocking agent used in the polyurethane prepolymer and the catalysts used for the epoxy reaction, temperatures below 300° F. and temperatures of even up to 450° F. may be used.

The amount of time necessary to effect thermal cure is also variable, dependent upon the relative amounts of constituents in the composition, the thickness of the coating desired and other factors. Generally, the amount of time required for thermal cure is from about 1 to about 30 minutes.

Additional constituents which may be included in the present invention include pigments and dyes, and even reactive diluents such as hydroxyl or epoxide terminated compounds. One or more catalysts, such as the urethane polymerizing catalysts and/or the epoxy polymerizing catalysts described previously, may also be added to the interpenetrating polymer composition prior to use. Typically, the total amount of catalysts added is from about 0.01–1.00% by weight of the total solids present in the composition. By the term "total solids" is meant all constituents of the interpenetrating polymer composition as formulated prior to use, excluding solvents or other liquid-phase additives.

The following examples are illustrative only and are not intended to limit the present invention. The examples are submitted in order to demonstrate more explicitly the process and composition of the present invention. Except as otherwise stated, all references to percent (%) are references to percent by weight and equivalents are on a weight basis.

EXAMPLE I

An interpenetrating polymer network was prepared by providing the following mixture:

| Constituents | Approximate Equivalent Weight | Weight % |
|---|---|---|
| EPON 828 epoxy resin* | 187 | 25.2 |
| Hardener 906 anhydride | 180 | 20.2 |
| Cargill 5797 blocked isocyanate** | 507 | 37.9 |
| Cargill 5763 polyester resin solution | 240 | 16.7 |

*diglycidyl ether of bisphenol A
**blocked aliphatic urethane

The composition described above was applied as a dilute solution in organic solvent by spraying onto sheet metal. The coated sheet metal was then baked at approximately 375° F. for approximately 15 minutes. The result was a hard coating exhibiting good adhesion characteristics having good corrosion and chemical resistance. The coating exhibited good flexibility when the sheet metal was deformed, showing no flaking and exhibiting good adhesion in the deformed area.

EXAMPLE II

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| Cargil 1117 epoxy resin solution | 650 | 42.0 |
| methyl tetrahydrophthalic anhydride | 165 | 8.3 |
| Desmodur LS 2759 blocked isocyanate | 471.9 | 34.0 |
| Cargill 5763 polyester resin solution | 240 | 15.7 |

EXAMPLE III

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| Cargil 1117 epoxy resin solution | 650 | 41.8 |
| AC methyl anhydride | 180 | 8.9 |
| Desmodur LS 2759 blocked isocyanate | 471.9 | 45.8 |
| Cargill 5763 polyester resin solution | 240 | 10.9 |

EXAMPLE IV

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| DEN 431 epoxy resin | 175 | 25.2 |
| methyl hexahydrophthallic anhydride | 165 | 18.0 |
| Desmodur BL 1260 blocked isocyanate | 940 | 45.8 |
| Cargill 5763 polyester resin solution | 240 | 10.9 |

EXAMPLE V

The procedure of Example I was followed in preparing the following composition and the sheet metal coated with the composition of this example. The coated exhibited similar characteristics to the coating of Example I:

| Constituents | Approximate Equivalent Weight | Weight % |
|---|---|---|
| DEN 431 epoxy resin | 175 | 25.2 |
| methyl tetrahydrophthalic anhydride | 165 | 18.0 |
| Desmodur BL 1260 blocked isocyanate | 940 | 45.8 |
| Cargill 5763 polyester resin solution | 240 | 10.9 |

EXAMPLE VI

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| DEN 431 epoxy resin | 175 | 24.8 |
| AC methyl anhydride | 180 | 19.4 |
| Desmodur BL 1260 blocked isocyanate | 940 | 45.1 |
| Cargill 5763 polyester resin solution | 240 | 10.7 |

EXAMPLE VII

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| EPN 1139 epoxy resin | 175 | 24.8 |
| Hardener 906 anhydride | 180 | 19.4 |
| Desmodur BL 1260 blocked isocyanate | 940 | 45.1 |
| Cargill 5763 polyester resin solution | 240 | 10.7 |

EXAMPLE VIII

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| Cargill 6685 polyester resin solution | | 29.0 |
| Cargill 4510 blocked isocyanate | | 29.9 |
| Cargill 1112 epoxy resin solution | | 30.1 |
| Hardener 906 anhydride | | 10.8 |

EXAMPLE IX

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| EPON 826 epoxy resin* | 182 | 19.8 |
| Dodecyl succinic anhydride | 270 | 23.4 |
| Cargill 5797 blocked isocyanate | 507 | 33.7 |
| Cargill 5776 | 370 | 23.1 |

*diglycidyl ether of bisphenol A

EXAMPLE X

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| EPN 1139 epoxy resin* | 175 | 27.8 |
| Hardener 906 anhydride | 180 | 21.6 |
| Cargill 5797 blocked isocyanate | | 35.0 |
| Cargill 5763 polyester resin solution | 240 | 15.6 |

*phenyl novolac epoxy resin

EXAMPLE XI

The procedure of Example I was followed in preparing the following composition and the sheet metal coated with the composition of this example. The coating exhibited similar characteristics to the coating of Example I:

| Constituents | Approximate Equivalent Weight | Weight % |
|---|---|---|
| Cargill 1117 epoxy resin solution* | 650 | 40.6 |
| Hardener 906 anhydride | 180 | 8.7 |
| Cargill 5797 blocked isocyanate | 507 | 35.3 |
| Cargill 5763 polyester resin solution | 240 | 15.2 |
| Baylith T (moisture scavenger) | — | 0.2 |

*advanced diglycidyl ether of bisphenol A

Although the present invention has been described with reference to preferred embodiments, workers skilled in the art will recognize that changes may be made in form and detail without departing from the spirit and scope of the invention.

What is claimed is:

1. An interpenetrating polymer network for use as a coating formed by the reaction product of a composition comprising:
   a blocked urethane prepolymer;
   a polyol;
   an epoxy resin; and an anhydride as an epoxy catalyzing agent.

2. The interpenetrating polymer network formed by the reaction product of the composition of claim 1 wherein the blocked urethane prepolymer has isocyanate functionality greater than 1.

3. The interpenetrating polymer network formed by the reaction product of the composition of claim 1 wherein the polyol is a polyester.

4. The interpenetrating polymer network formed by the reaction product of the composition of claim 1 wherein the composition further includes a solvent.

5. The interpenetrating polymer network formed by the reaction product of the composition of claim 1 wherein the polyol is a saturated polyester resin and wherein the blocked urethane prepolymer is in the equivalent weight range of approximately 170 to 3,000, the polyester is in the equivalent weight range of approximately 195 to 2,000, the epoxy resin is in the equivalent weight range of approximately 170 to 3,000, and the anhydride is in the equivalent weight range of approximately 100–270.

6. The interpenetrating polymer network formed by the reaction product of the composition of claim 5, wherein the blocking agent is caperolactone.

* * * * *

UNITED STATES PATENT AND TRADEMARK OFFICE
CERTIFICATE OF CORRECTION

PATENT NO. : 4,923,934
DATED : May 8, 1990
INVENTOR(S) : Todd A. Werner

It is certified that error appears in the above-identified patent and that said Letters Patent is hereby corrected as shown below:

Col. 10, line 33, delete "claim I", insert --claim 1--.

Col. 10, line 54, delete "caperolactone", insert --caprolactone".

Signed and Sealed this

Eighteenth Day of February, 1992

Attest:

HARRY F. MANBECK, JR.

*Attesting Officer*          *Commissioner of Patents and Trademarks*